March 19, 1957

K. V. KEELEY 2,786,097

TELEGRAPH REPEATERS

Filed March 5, 1954

INVENTOR

Kedric V. Keeley

March 19, 1957  K. V. KEELEY  2,786,097
TELEGRAPH REPEATERS
Filed March 5, 1954  2 Sheets-Sheet 2

INVENTOR
Kedric V. Keeley

United States Patent Office 2,786,097
Patented Mar. 19, 1957

2,786,097

TELEGRAPH REPEATERS

Kedric V. Keeley, Los Angeles, Calif.

Application March 5, 1954, Serial No. 414,433

4 Claims. (Cl. 178—71)

This invention relates to a telegraph repeater which in multiple form constitutes an automatic two-way telegraph repeater and has for one of its objects the marked reduction of any tendency toward self-regeneration and has for another of its objects simplicity of design, operation, and maintenance.

Two-way telegraph repeaters are used to couple two otherwise independent telegraph circuits such that messages can be sent in either direction between the operating locations of said two circuits. Such repeaters are used instead of direct connections between the two telegraph circuits to provide flexibility in cross connections between telegraph circuits or to provide a desirable re-shaping of the transmitted signal wave shapes. Automatic two-way repeaters are such that no attention need be given the device when a reversal in direction of signal transmission is to be effected.

In the parlance of the art, repeater installations are usually considered as coupling two telegraph lines together, as mentioned above; one such telegraph line being called the East line and the other such telegraph line being called the West line. Such parlance is used in this specification even though it is obvious that geographical direction of transmission is of no significance to the technical operation described in this specification. Also, in basic discussions of telegraph theory, it is common practice to assume conditions of zero current and full current in telegraph lines even though it is well known that insulation leakage and other factors may prevent current from reaching absolute zero or absolute full calculated values.

In many automatic two-way telegraph repeaters, it is possible, through a simple misadjustment, to bring about self-oscillations; under which conditions the repeaters are inoperable. Another problem commonly recognized in two-way repeater designs, is a form of degeneration in which a no-current signal originating on the East line, coupled with a no-current signal originating on the West line will cause the repeater to lock in a no-current position in both directions and regardless of any additional manipulations performed on either the East or West line, the repeater remains inoperable until an attendant restores it to normal operation. To eliminate the above mentioned deficiencies of two-way telegraph repeaters, it is common practice to complicate said repeaters by the use of additional relays or additional relay contact points or by the inclusion of relay armature reaction time control devices or some combination thereof.

It is an object of this invention to provide a simple and inexpensive automatic two-way telegraph repeater which possesses neither the tendency to self-oscillate nor the tendency to lock out.

Another object of this invention is to minimize maintenance through the use of only two sets of single pole, single throw relay contacts in an automatic two-way telegraph repeater. Yet another object of this invention is to provide an automatic two-way telegraph repeater which is relatively simple in construction and capable of economic manufacture.

Yet another object of this invention is to provide an automatic two-way repeater which is relatively simple to adjust and which will maintain good operating accuracy over a wide range of latitude of associated electrical and physical variations, and which does not include any devices or parts intended to delay the reaction time of any of the incorporated relay armatures.

The manner of accomplishing the foregoing objects as well as further objects and advantages will be made manifest in the following description taken in connection with the accompanying drawings in which.

Figure 1:
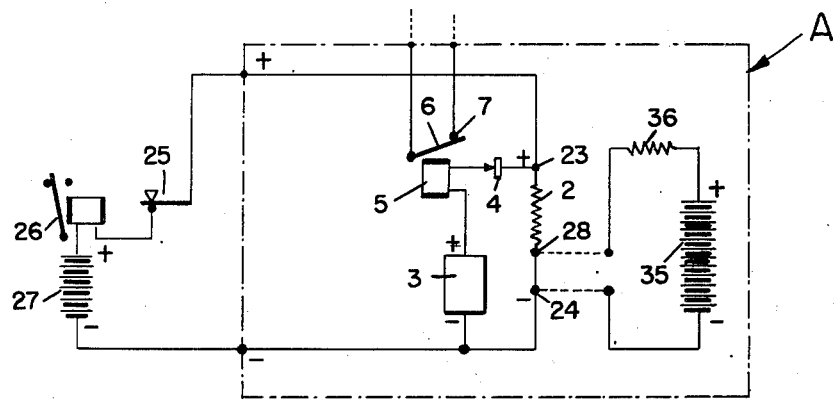
Fig. 1 is a drawing of my fundamental circuit forming approximately one-half of the automatic two-way telegraph repeater circuit, along with a commonly known telegraph circuit.

Referring specifically to the drawings, the circuit and operation of Fig. 1 is described as follows: Fig. 1 depicts the fundamental circuit constituting approximately one-half of my proposed automatic two-way telegraph repeater; said fundamental circuit consisting of resistance 2, electrical energy source 3, rectifier 4, relay coil 5, relay armature 6, relay contacts 7, junction 23, junction 24, junction 28, and interconnecting wires as shown along with a connected commonly known basic telegraph circuit consisting of telegraph key 25, sounder 26, battery 27 and interconnecting wires as shown. The telegraph circuit is not part of my invention but is included in the drawing to simplify my disclosure of circuit design and operation. In this and all accompanying drawings my invention relates only to the circuit portions within the dotted rectangles A, B, C and D. Approximately one-half of a full repeater circuit is shown in Fig. 1 since this one-half portion can be more easily described and since it can be combined with a second similar portion, or a properly designed dissimilar portion to form a full two-way automatic repeater. It is my intention that the full two-way automatic repeater would consist of two of these similar portions, but in this disclosure, I wish to recognize the importance of the fundamental circuit depicted in Fig. 1, and I wish to recognize the possibility that one or more of these fundamental circuits could be used in automatic two-way telegraph repeater installations.

The telegraph circuit with polarity as shown, causes current to flow through resistance 2 producing a voltage drop across resistance 2 with the polarity indicated. Resistance 2 is shunted with a series circuit consisting of electrical energy source 3, rectifier 4 and relay coil 5. Rectifier 4 is so connected that it opposes any flow of current in relay coil 5 which might be caused by the telegraph supply source battery 27. Electrical energy source 3 is either of alternating potential, or is of unidirectional potential of such polarity as shown to tend to cause current to flow in the conducting direction of rectifier 4. Observing the polarity indicated on electrical energy source 3 and on resistance 2, it is obvious that the voltage drop on resistance 2, caused by current from the telegraph circuit supply battery 27, tends to oppose any current flow from electrical energy source 3. The voltage of electrical energy source 3 is selected sufficiently low then when full telegraph circuit current is flowing in resistance 2, current from electrical energy source 3 flowing in relay coil 5 will be zero or of insufficient quantity to cause relay armature 6 to operate and the voltage of electrical energy source 3 is simultaneously adjusted sufficiently high that when the telegraph circuit current is reduced to zero by the opening of telegraph key 25, and there will be no voltage caused by the telegraph circuit current across resistance 2, electrical energy source 3 will cause sufficient current to flow through relay coil 5, rectifier 4 and resistance 2 to cause relay armature 6 to operate and open relay contacts 7.

From the foregoing it is apparent that when telegraph key 25 is opened, relay contacts 7 are caused to open and when telegraph key 25 is closed, relay contacts 7 are permitted to close and thus the opening and closing of telegraph key 25 is repeated by contacts 7.

If electrical energy source 3 is of alternating potential, it is obvious from the existence of rectifier 4 that electrical energy source 3 could not produce any current in the circuit when the polarity of electrical energy source 3 is opposed by the non-conducting direction of rectifier 4. Therefore, rectifier 4 would limit the action of electrical energy source 3 to those half cycles wherein its polarity is as indicated and the operation of the circuit would be as described above.

An important aspect in the circuit in Fig. 1 is that if the circuit is broken between junctions 24 and 28 while the telegraph circuit is otherwise closed, current from the telegraph battery 27 can not flow through rectifier 4 and therefore the telegraph circuit current will be reduced to zero and yet relay coil 5 will not be energized. This illustrates, therefore, that in the circuit of Fig. 1, the telegraph current can be interrupted at key 25 and relay coil 5 will become energized, but if the telegraph circuit is interrupted between junctions 24 and 28, relay coil 5 will not be energized.

A polar type of operation can be applied to the basic repeater circuit of Fig. 1, as shown, by considering battery 35, resistance 36, and the associated dotted connecting wires. If the repeater circuit is broken between junctions 24 and 28, the telegraph circuit will be interrupted, as mentioned above, but if while the connection between junctions 24 and 28 is open, battery 35 is applied to junctions 24 and 28 in the polarity indicated, and if battery 35 is of greater voltage than battery 27, current in the telegraph circuit will be caused to flow in reverse direction; however, the polarity between junctions 23 and 24 will remain as shown and no current will flow in rectifier 4 and thus coil 5 will not be energized. On the other hand, if junctions 24 and 28 are reconnected to each other, resistor 36 prevents damage to battery 35. Then, if the polarity of battery 27 is reversed, the current flowing through resistor 2 will assume a polarity opposite to that indicated, and rectifier 4 will allow current to flow and relay coil 5 will be energized. Since, under this condition, the voltage across resistor 2 would aid electromotive source 3 in sending current through relay coil 5, electromotive source 3 could be eliminated and replaced with a solid connection. This is illustrated in the automatic two-way polar repeater circuit of Fig. 4 by wires 41 and 42.

Therefore, considering the steps mentioned above concerning Fig. 1, it is possible to reverse the telegraph circuit current at battery 27 and cause relay coil 5 to become energized, but if the telegraph circuit is reversed by applying battery 35 across an open connection between junctions 24 and 28, the relay coil 5 will not become energized.

Figure 2:
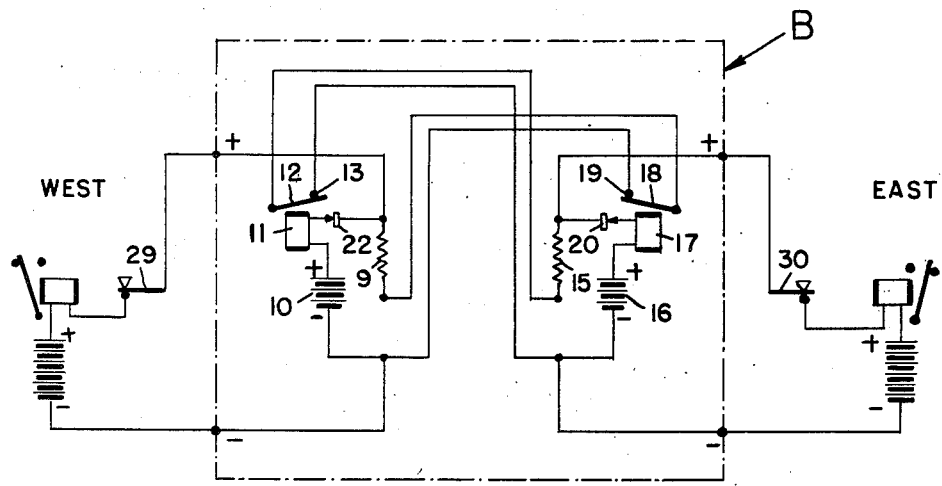
Fig. 2 is a drawing showing two of the fundamental circuits of Fig. 1 in combination with each other to form a complete automatic two-way telegraph repeater and with two indicated neutral telegraph lines; said telegraph lines being coupled together through the automatic two-way telegraph repeater.

The circuitry and operation of Fig. 2 is as follows: When full current flows from the West telegraph circuit through resistance 9, a voltage is produced across resistance 9 which prevents battery 10 from producing sufficient current in relay coil 11 to operate relay armature 12, thus contacts 13 remain closed. Likewise, when full current flows from the East telegraph circuit through resistance 15, a voltage is produced across resistance 15 which prevents battery 16 from causing sufficient current in relay coil 17 to operate relay armature 18, thus contacts 19 remain closed.

If the key 29 of the West telegraph circuit is opened, such that the current of the West telegraph circuit is reduced to zero, the current in resistance 9 will reduce and the voltage across resistance 9 will likewise reduce. This will permit battery 10 to transmit additional current through relay coil 11 causing relay armature 12 to operate causing contacts 13 to open. Opening contacts 13 causes the path of the East telegraph circuit through resistance 15 to be broken. Current from the East telegraph circuit can not flow through rectifier 20 because rectifier 20 is polarized to oppose such current flow. Relay armature 18 will not be caused to operate by the opening of contacts 13 and thus while the path of the East telegraph circuit has been broken at contacts 13, a comparable break of the West telegraph circuit at contacts 19 does not occur. If, while contacts 13 are open, the key 30 of the East telegraph circuit is manipulated, there will be no significant effect since the path of the East telegraph circuit has already been broken by contacts 13. Thus, there is no tendency for the repeater to lock out or to oscillate.

When the key 29 of the West telegraph circuit is closed to cause full current in the West telegraph circuit, current in resistance 9 will be restored and the restored voltage across resistance 9 will oppose the current from battery 10 and the energy in relay coil 11 will be reduced, releasing armature 12, closing contacts 13 and restoring the current in the East telegraph circuit.

Likewise, assuming full current in the West telegraph circuit, if the key 30 of the East telegraph circuit is manipulated to reduce the current of the East telegraph circuit to zero, the current in resistance 15 will decrease and the voltage across resistance 15 will likewise decrease, and battery 16 will transmit more energy into relay coil 17 causing armature 18 to be operated, opening contacts 19, breaking the current flow in the West telegraph circuit.

Figure 3:
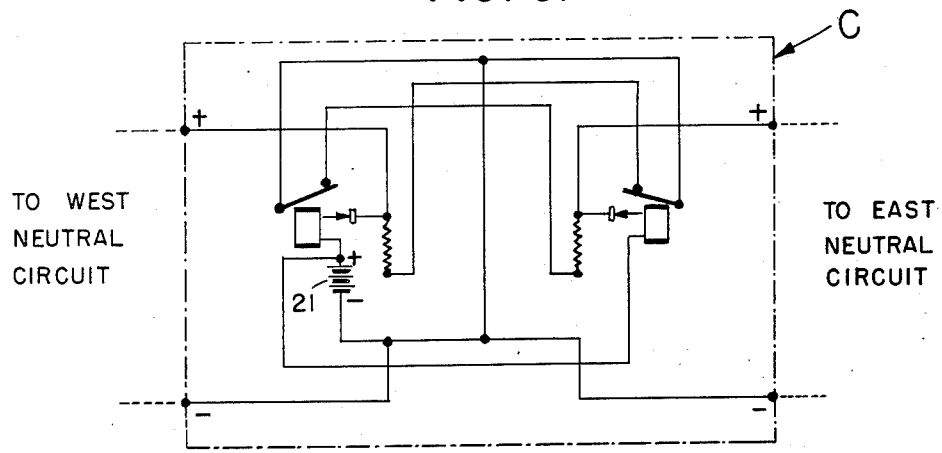
Fig. 3 is a drawing of the repeater of Fig. 2 but with modifications such that the repeater may be constructed more economically than the circuit of Fig. 2, through the combining of certain similar components into a single unit.

The circuitry and operation of Fig. 3 is similar to that of Fig. 2 excepting that batteries 10 and 16 of Fig. 2 have been combined as one battery 21. This combining is feasible when one conductor of each telegraph circuit is common, or can be made common.

It is recognized that if a proper source of electrical energy is connected across relay contacts 13 of Fig. 2, and a second proper source of electrical energy is connected across relay contacts 19 of Fig. 2, the repeater as otherwise depicted could be made to operate as a polar telegraph circuit automatic two-way repeater and this would be true even though batteries 10 and 16 were eliminated and replaced with solid connections. The connection of electrical energy across contacts 13 and 19 could be achieved by using sources of relatively high impedance as is illustrated by the combination of resistor 36 and battery 35 across junctions 24 and 28 of Fig. 1, or by adding additional contacts as is done in contacts 37 and 38 of Fig. 4, to prevent these electrical energy sources from becoming short circuited when contacts 13 and 19 are closed.

Figure 4:
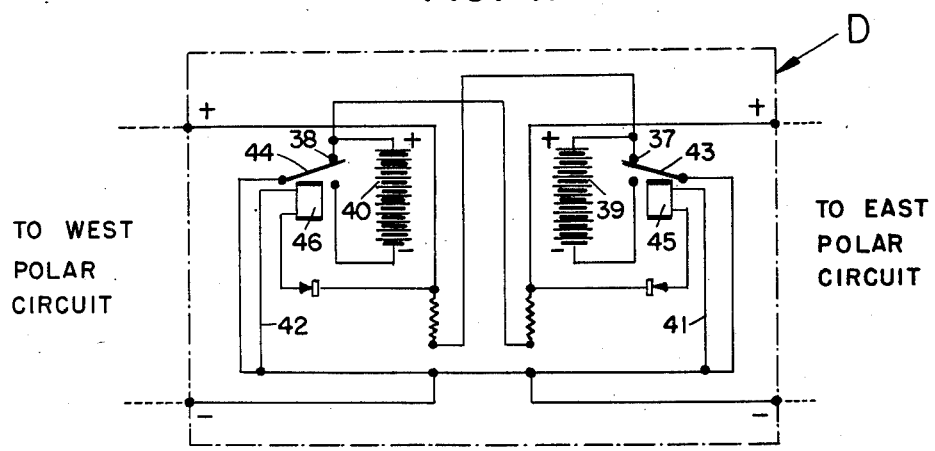
Fig. 4 is a drawing of the repeater of Fig. 3 but with modifications to best accommodate polar telegraph lines.

Fig. 4, therefore, shows my automatic two-way repeater designed for operation with two polar telegraph lines having one side of each line common. Fig. 4, also shows the additional relay contacts at 37 and 38 to disconnect batteries 39 and 40 when said batteries are not inserted in their respective telegraph circuits by the operation of armatures 43 and 44. Attention is directed to wires 41 and 42 to indicate that no local energy source is required to energize relay coils 45 and 46 when polar telegraph circuits are used.

One successful embodiment of this repeater applied to two neutral telegraph circuits, is as follows:

Referring to Fig. 2, a relay of commercial manufacture was used with coil 11 having a resistance of 200 ohms and having a high speed armature 12 and contacts 13 and a second similar relay was used for coil 17, armature 18 and contacts 19. Rectifiers 20 and 22 were of the available diffused germanium type while resistors 9 and 15 were each 200 ohms. Normal current from the West telegraph circuit through resistor 9 was 60 milliamperes from a 100 volt battery and normal current from the East telegraph circuit through resistor 15 was 60 milliamperes from a 100 volt battery. Electrical energy sources 10 and 16 each had a nominal value of 12 volts obtained from eight dry cells of the well known No. 6 variety. With telegraph keys 29 and 30 closed, the current in coils 11 and 17 was approximately 4 milliamperes and the armatures were unoperated. When key 29 was opened, the current in relay coil 11 rose to 22 milliamperes causing armature 12 to operate and contacts 13 to open. With contacts 13 open the reverse current through rectifier 20 was approximately .2 milliampere and was far from sufficient to cause undesirable operation of armature 18.

What is claimed is:

1. A two-way automatic telegraph repeater consisting of two major electrical circuits each consisting of two minor electrical circuits, one such minor circuit in each major circuit being a resistance and a pair of contacts in series and the other minor electrical circuit in each major electrical circuit being connected in parallel with the aforementioned minor circuit and consisting of three elements in series connection, as follows: a rectifier, a relay coil, and an electrical energy source; and the contacts of each major circuit being so related to the relay coil of the other major circuit that when the related relay coil is energized, the contacts are opened, and when the related relay coil is unenergized, the contacts are closed, and means for connecting separate telegraph circuits to each of the major circuits; one side of each such telegraph circuit to connect to the end of the resistance in each major circuit furtherest from the contacts and the other side of each telegraph circuit to connect to the contact in each major circuit furtherest from the resistance.

2. A two-way automatic telegraph repeater consisting of a combination substantially described as in claim 1 excepting that the two electrical energy sources are connected in parallel to form one electrical energy source; all other elements and connections remaining as described in claim 1.

3. An automatic two-way telegraph repeater consisting of two groups of circuits; each group containing two branch circuits; the first branch circuit in each group being a resistance connected in series with a pair of contacts, said contacts being one stationary and the moving contact of a single pole double throw relay; the resistance being connected to the stationary contact, and the first branch circuit further consisting of an electrical energy source connected across the stationary contacts of the aforementioned single pole double throw relay; the second branch circuit in each group being connected in parallel with the resistance and its series pair of contacts of the first branch circuit of the same group, and consisting of two elements in series connection, as follows: a rectifier and a relay coil; and means for connecting separate telegraph circuits to each of the aforementioned groups, one side of each said telegraph circuit to connect to the end of the resistance and the other side of each said telegraph circuit to connect to the moving contact, and the two groups arranged such that the relay contacts in each group constitutes the contacts related to and actuated by the aforementioned relay coil of the other group.

4. An automatic two-way telegraph repeater consisting of two groups of circuits, each group containing two branch circuits described as follows: the first branch circuit possessing means for routing current from an external telegraph circuit through said first branch circuit and possessing means for establishing across said first branch circuit a voltage in proportion to and in opposition of the flow of mark telegraph current and possessing means for altering the ratio of said opposing voltage to said mark current; the second branch circuit being in parallel connection with the first and possessing means to prevent the flow at any time through the second branch circuit of any current in the direction which mark current will tend to flow from said external telegraph circuit and insuring the flow of usable current in the other direction in said second branch circuit when the aforesaid opposing voltage across said first branch circuit and in the direction to oppose mark current flow in said first branch circuit falls below a predetermined algebraic value; and said second branch circuit possessing means to cause any intermittence of said usable current to key a telegraph circuit said automatic two-way telegraph repeater further consisting of an interconnection between said two groups such that the means to key a telegraph circuit possessed in the second branch circuit in each group controls the ratio of opposing voltage to the flow of marked current in the first branch circuit of the other group.

References Cited in the file of this patent

UNITED STATES PATENTS

| | | |
|---|---|---|
| 2,498,588 | Spencer et al. | Feb. 21, 1950 |
| 2,770,677 | Harris | Nov. 13, 1956 |